(12) United States Patent
Jones et al.

(10) Patent No.: US 9,796,039 B2
(45) Date of Patent: Oct. 24, 2017

(54) METHOD AND APPARATUS FOR CHANGING THE ELECTRODE TIP OF A TIG WELDER

(71) Applicant: Changer & Dresser Inc., Anniston, AL (US)

(72) Inventors: Joshua Eric Jones, Oxford, AL (US); Daniell Blake Oscar Newton, Anniston, AL (US)

(73) Assignee: Changer & Dresser Inc., Anniston, AL (US)

( * ) Notice: Subject to any disclaimer, the term of this patent is extended or adjusted under 35 U.S.C. 154(b) by 213 days.

(21) Appl. No.: 14/798,015

(22) Filed: Jul. 13, 2015

(65) Prior Publication Data

US 2016/0016251 A1 Jan. 21, 2016

Related U.S. Application Data

(60) Provisional application No. 62/025,672, filed on Jul. 17, 2014.

(51) Int. Cl.
| | | |
|---|---|---|
| *B23Q 3/155* | (2006.01) | |
| *B23K 9/32* | (2006.01) | |
| *B23K 9/167* | (2006.01) | |
| *B25J 15/06* | (2006.01) | |
| *B25J 15/04* | (2006.01) | |
| *B23K 9/24* | (2006.01) | |

(52) U.S. Cl.
CPC .................. *B23K 9/24* (2013.01); *B23K 9/32* (2013.01); *B23Q 3/15573* (2013.01); *B25J 15/045* (2013.01); *B25J 15/0616* (2013.01); *B23K 9/167* (2013.01); *B23K 9/1675* (2013.01); *Y10T 483/13* (2015.01); *Y10T 483/17* (2015.01)

(58) Field of Classification Search
CPC ........................... Y10T 483/17; Y10T 483/13
USPC ....................................................... 483/16, 7
See application file for complete search history.

(56) References Cited

U.S. PATENT DOCUMENTS

| | | |
|---|---|---|
| 4,645,901 A | 2/1987 | Scholz et al. |
| 4,733,050 A | 3/1988 | Grafius |

(Continued)

FOREIGN PATENT DOCUMENTS

| | | | |
|---|---|---|---|
| JP | 05-077044 A | * | 3/1993 |
| JP | 05-084586 A | * | 4/1993 |

(Continued)

OTHER PUBLICATIONS

Machine Translation of JP 05-077044-A, which JP '044 was published Mar. 1993.*

(Continued)

*Primary Examiner* — Erica E Cadugan
(74) *Attorney, Agent, or Firm* — Burr & Forman LLP; Harvey S. Kauget (57) ABSTRACT

The present invention is an apparatus and method for replacing used electrode tips of a TIG welder. The apparatus has a main housing structure with a socket adapter assembly that is operatively supported by the main housing structure. The socket adapter assembly is used to both remove and re-attach the gas shield and the electrode nut of the TIG welder. A vacuum tip suction device that is operatively supported by the main housing structure is used to both remove and install electrode tips for the TIG welder.

15 Claims, 5 Drawing Sheets

(56) References Cited

U.S. PATENT DOCUMENTS

| | | | |
|---|---|---|---|
| 5,002,500 A * | 3/1991 | Zuccaro | B23K 11/318 |
| | | | 483/16 |
| 5,258,599 A | 11/1993 | Moerke | |
| 5,512,726 A * | 4/1996 | Arantes | B23K 9/1336 |
| | | | 483/16 |
| 5,734,141 A * | 3/1998 | Voilmy | B23K 11/3072 |
| | | | 483/16 |
| 8,574,140 B2 * | 11/2013 | Erlenmaier | B23K 26/1482 |
| | | | 483/16 |
| 2005/0211684 A1 | 9/2005 | Jaeger et al. | |
| 2006/0240961 A1 | 10/2006 | Hagihara et al. | |
| 2008/0190899 A1 | 8/2008 | Sugahara et al. | |
| 2013/0008003 A1 | 1/2013 | Izutani et al. | |
| 2014/0080690 A1 * | 3/2014 | Noma | B23K 37/0229 |
| | | | 483/55 |
| 2015/0196977 A1 | 7/2015 | Hughes | |
| 2017/0057002 A1 * | 3/2017 | Itsukaichi | B25J 15/10 |
| 2017/0072500 A1 * | 3/2017 | Marakkala Manage | B23K 9/26 |

FOREIGN PATENT DOCUMENTS

| | | | |
|---|---|---|---|
| JP | 06-262357 A | * | 9/1994 |
| JP | 11-239876 A | * | 9/1999 |
| JP | 2001-105134 A | * | 4/2001 |
| WO | WO-2017046990 A1 | * | 3/2017 |

OTHER PUBLICATIONS

Machine Translation of JP 2001-105134-A, which JP '134 was published Apr. 2001.*

"TIG-IT: How a TIG Welder Works and When to TIG Weld", by Sleepy Gomez, printed from https://millerwelds.com/resources/article-library/tig-it-how-a-tig-welder-works-and-when-to-tig-weld on Jul. 12, 2017.*

* cited by examiner

METHOD AND APPARATUS FOR CHANGING THE ELECTRODE TIP OF A TIG WELDER

CROSS REFERENCES TO RELATED APPLICATIONS

This application claims priority from and is related to commonly owned U.S. Provisional Patent Application Ser. No. 62/025,672 filed Jul. 17, 2014, entitled: Method and Apparatus for Changing the Electrode Tip of a TIG Welder, this Provisional Patent Application incorporated by reference herein.

FIELD OF THE INVENTION

The invention relates generally to welding devices, and more particularly to tools for the removal and/or installation of electrode tips into or from TIG welders.

BACKGROUND

The present invention relates to welding apparatus and methods used in tungsten-inert-gas (TIG) welding of steel-based materials.

Conventionally, structures made of steel-based materials, such as carbon steel or stainless steel as the base material, are welded using TIG welding processes. TIG welding is widely used as a method of welding structures requiring high reliability since the welding operation can be easily performed and the welded metal portion can be formed with high-quality.

In TIG welding, a torch is connected to a remote power source by a flexible tube through which is passed a power lead and gas for creating an arc between a tungsten electrode and a work piece, while shielding gas passes around the arc. The tip of the electrode requires replacement over time. To date, this tip replacement has been a manual process which results in equipment downtime and safety issues during the replacement of the tip of the electrode being held by a robotic arm.

Therefore, what is needed is a method and apparatus which can be used to replace the tip of a TIG welder.

Nothing in the prior art provides the benefits attendant with the present invention.

Therefore, it is an object of the present invention to provide an improvement which overcomes the inadequacies of the prior art methods and devices and which is a significant contribution to the advancement to the welding art using a TIG welder.

Another object of the present invention is to provide an apparatus for replacing used electrode tips of a TIG welder comprising: a main housing structure; a socket adapter assembly operatively supported by said main housing structure; and a vacuum tip suction device operatively supported by said main housing structure.

Yet another object of the present invention is to provide an apparatus for replacing used electrode tips of a TIG welder comprising: a lower housing structure; a first moveable slide operatively connected to said lower housing structure; a first cylinder operatively supported within said first moveable slide; an upper housing structure operatively supported by said first moveable slide; a socket adapter assembly within said upper housing structure; and a vacuum tip suction device operatively supported by said upper housing structure.

Still yet another object of the present invention is to provide a method for replacing used electrode tips of a TIG welder comprising: providing a robotic arm, said robotic arm holding the TIG welder; moving the TIG welder into a tip change position; providing a main housing structure having a socket adapter assembly operatively supported by said main housing structure, and a vacuum tip suction device operatively supported by said main housing structure; unthreading a gas shield from the TIG welder using said socket adapter assembly; unthreading an electrode nut from the TIG welder using said socket adapter assembly; removing a used electrode tip from the TIG welder using said vacuum tip suction device; placing a new electrode tip into said electrode nut using said vacuum tip suction device; threading said electrode nut with said new electrode tip onto the TIG welder using said socket adapter assembly; and threading said gas shield onto the TIG welder using said socket adapter assembly.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The present invention provides an apparatus and method for removing used electrode tips from a TIG welder and replacing the used electrode tip with a new electrode tip. The apparatus and method provide a system that allows for greater reliability, reduces downtime and increases safety in the use a TIG welder.

Another feature of the present invention is to provide an apparatus for replacing used electrode tips of a TIG welder. The apparatus has a main housing structure that can have a lower housing structure and an upper housing structure. A socket adapter assembly is operatively supported by the main housing structure. A vacuum tip suction device is operatively supported by the main housing structure. The apparatus can have an electrode tip magazine that is operatively supported by the main housing structure. The apparatus can have a sensor that is operatively connected to the electrode tip magazine. The apparatus can have a moveable arm that is operatively supported by the main housing structure. The apparatus can have a first motor that is operatively connected to the socket adapter assembly. The apparatus can have a second motor that is operatively connected to the socket adapter assembly. The apparatus can have a plurality of slides and cylinders that are operatively connected to the main housing structure.

Yet another feature of the present invention is to provide an apparatus for replacing used electrode tips of a TIG welder. The apparatus has a lower housing structure. A first moveable slide is operatively connected to the lower housing structure. A first cylinder is operatively supported within the first moveable slide. An upper housing structure is operatively supported by the first moveable slide. A socket adapter assembly is within the upper housing structure. A vacuum tip suction device is operatively supported by the upper housing structure. The apparatus can have an electrode tip magazine that is operatively supported by the upper housing structure. The apparatus can have a sensor that is operatively connected to the electrode tip magazine. The apparatus can have a second moveable slide that is operatively connected to the first cylinder. The apparatus can have a moveable arm that is operatively supported by the upper housing structure. The apparatus can have a first motor that is operatively connected to the socket adapter assembly. The apparatus can have a second motor that is operatively connected to the socket adapter assembly. The apparatus can have a second cylinder that is operatively connected to the vacuum tip suction device.

Still yet another feature of the present invention is to provide a method for replacing used electrode tips of a TIG welder. The method comprising the following steps: a robotic arm is provided that holds the TIG welder. The TIG welder is moved into a tip change position using the robotic arm. A main housing structure is provided. The main housing structure has a socket adapter assembly that is operatively supported by the main housing structure and a vacuum tip suction device that is operatively supported by the main housing structure. A gas shield is unthreaded from the TIG welder using the socket adapter assembly. An electrode nut is unthreaded from the TIG welder using the socket adapter assembly. A used electrode tip is removed from the TIG welder using the vacuum tip suction device. A new electrode tip is placed into the electrode nut using the vacuum tip suction device. The electrode nut is threaded with the new electrode tip onto the TIG welder using the socket adapter assembly. The gas shield is threaded onto the TIG welder using the socket adapter assembly. The used electrode tip can be placed into an empty holding position on an electrode tip magazine. A sensor can be used to locate the empty holding position on the electrode tip magazine. A first motor can be provided that is operatively connected to the socket adapter assembly. The gas shield can be unthreaded from the TIG welder using the first motor as operatively connected to the socket adapter assembly. A second motor can be provided that is operatively connected to the socket adapter assembly. The electrode nut can be unthreaded from the TIG welder using the second motor as operatively connected to the socket adapter assembly. The electrode nut with the new electrode tip can be threaded onto the TIG welder using the second motor as operatively connected to the socket adapter assembly. The gas shield can be threaded onto the TIG welder using the first motor as operatively connected to the socket adapter assembly. A moveable arm can be provided that is operatively supported by the main housing structure. The moveable can be used to knock stuck used electrode tips loose from the TIG welder.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Similar reference characters refer to similar parts throughout the several views of the drawings.

DETAILED DESCRIPTION OF THE INVENTION

The present invention provides an apparatus and method for replacing a used electrode tip of a TIG welder with a new electrode tip. A typical TIG welder assembly 200 has a robotic arm holding the TIG welder 220 as shown in FIGS. 1A to 1D. The robotic arm must be moved to a tip change position. The tip change position places the electrode tip over the present invention. Usually, a software routine can be initiated to move the robotic arm to the tip change position.

Figure 1A:
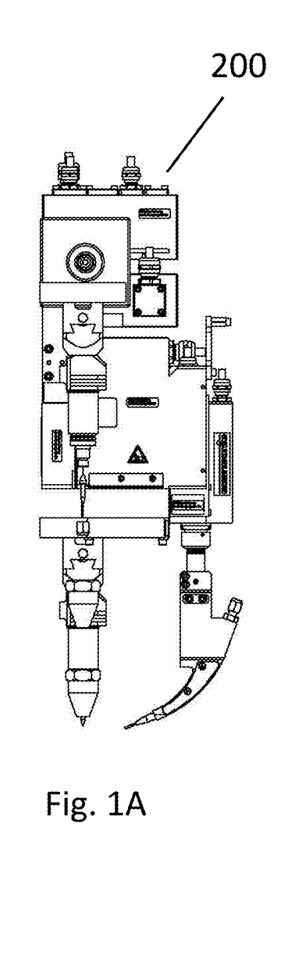
FIG. 1A is a side view of a TIG welder assembly.
Figures 1B, 1C:
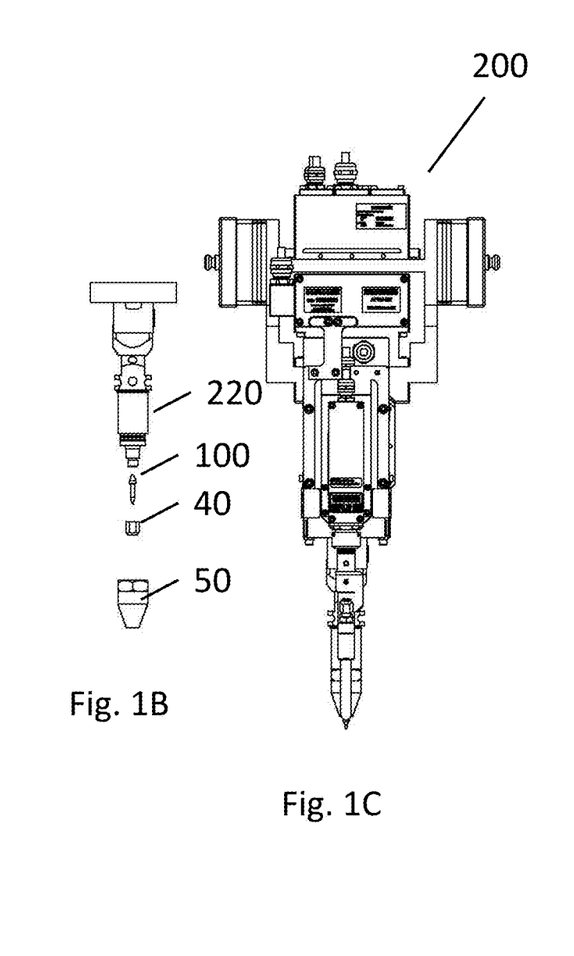
FIG. 1B is an exploded view of a TIG welder.
FIG. 1C is a front view of a TIG welder assembly.
Figure 1D:
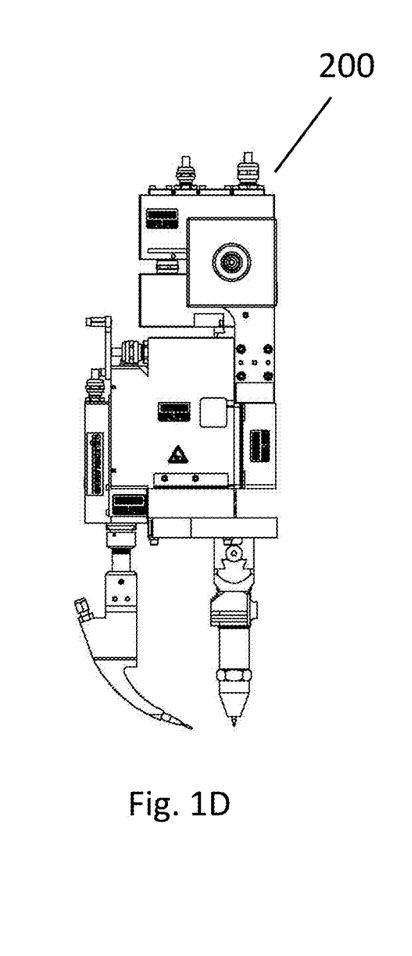
FIG. 1D is a side view of a TIG welder assembly.
Figure 2:
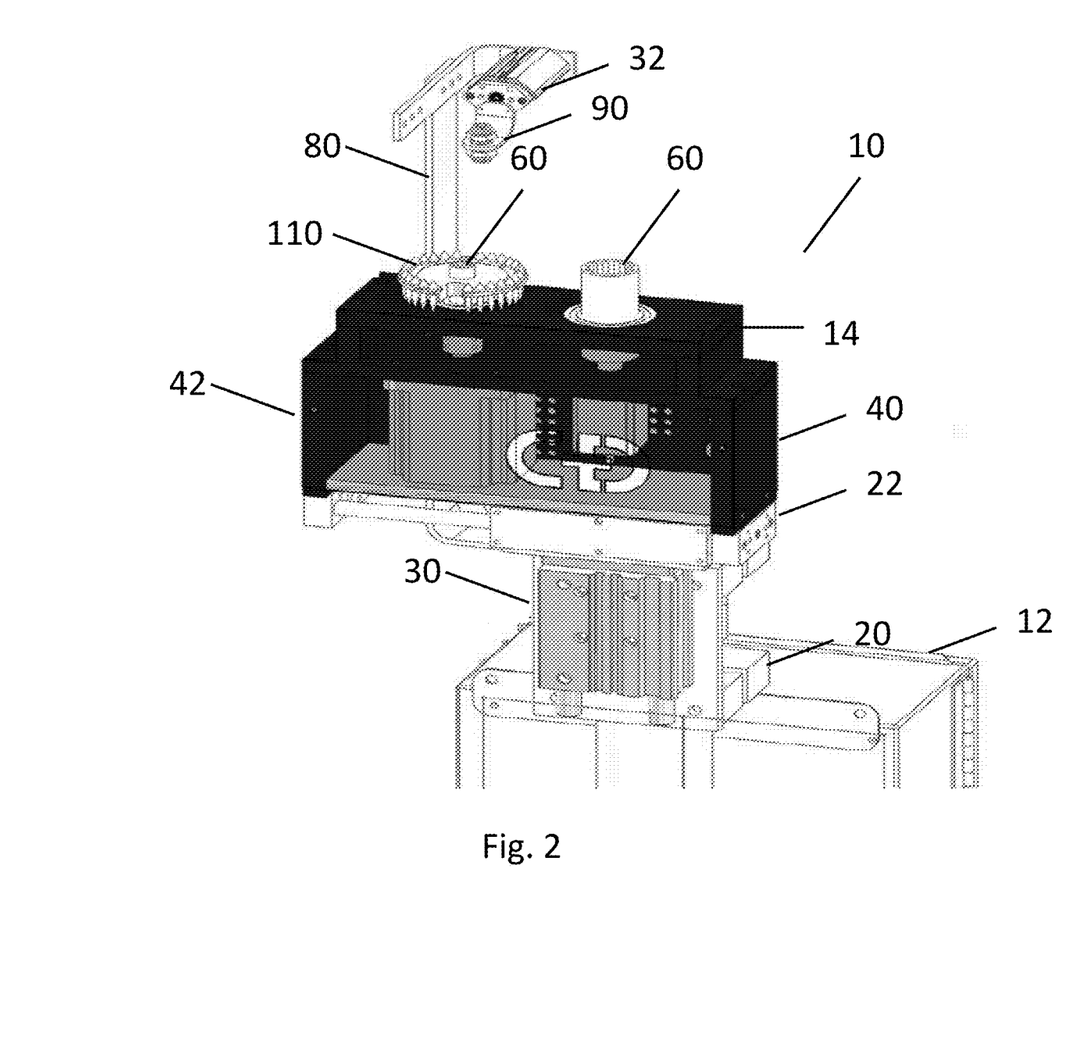
FIG. 2 is a back view of a TIG welder tip changing system according to one embodiment of the present invention.
Figure 3A:
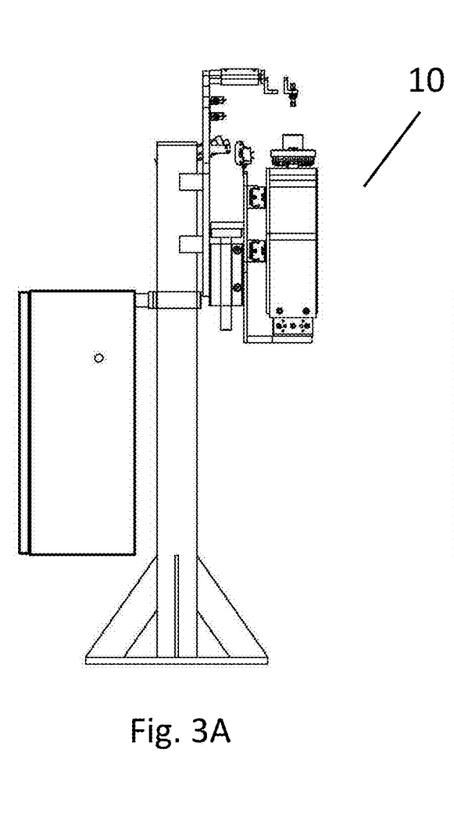
FIG. 3A is a side view of a TIG welder tip changing system according to one embodiment of the present invention.
Figure 3B:
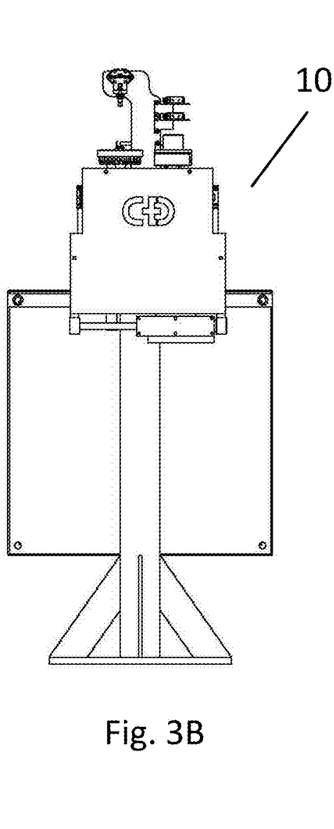
FIG. 3B is a front view of a TIG welder tip changing system according to one embodiment of the present invention.
Figure 3C:
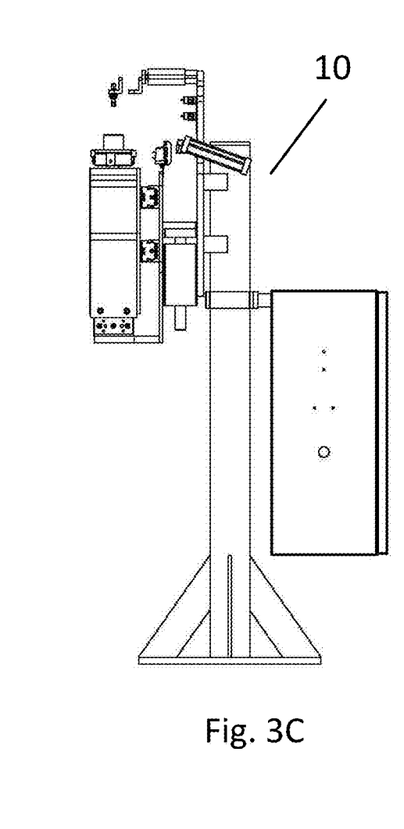
FIG. 3C is a side view of a TIG welder tip changing system according to one embodiment of the present invention.

As shown in FIG. 2, the present invention 10 is an apparatus that has a lower housing structure 12 and an upper housing structure 14. The housing structures 12, 14 have a plurality of slides 20, 22 and cylinders 30, 32 (that can move up/down, left/right and rotationally, typically through a software routine) to move a first motor 40 to a first position to engage a gas shield 50 of the TIG welder 220 with a first socket adapter assembly 60.

Once the plurality of slides 20, 22 and cylinders 30, 32 start to move the first motor 40 into a first position, the first motor 40 starts to rotate in a first direction to unthread the gas shield 50 from the TIG welder 220. At the completion of unthreading of the gas shield 50, the plurality of slides 20, 22 and cylinders 30, 32 can move the first motor 40 to a second position.

The plurality of slides 20, 22 and cylinders 30, 32 move the second motor 42 to the second position to engage an electrode nut 70 of the TIG welder 220 with the socket adapter assembly 60. Once the plurality of slides 20, 22 and cylinders 30, 32 move the second motor 42 into the second position, the second motor 42 starts to rotate in a second direction to unthread the electrode nut 70 from the TIG welder 220 using the socket adapter assembly 60. At the completion of unthreading the electrode nut 70, the plurality of slides 20, 22 and cylinders 30, 32 can return the second motor 42 to the first position.

The plurality of slides 20, 22 and cylinders 30, 32 are used to position an arm 80 that has a vacuum tip suction device 90 to the second position and to center the vacuum tip suction device 90 above an electrode nut position. The plurality of slides 20, 22 and cylinders 30, 32 move the second motor 42 with the removed electrode nut 70 up to the second position where the vacuum tip suction device 90 is used to grab a used electrode tip 100 from the TIG welder 220. Using the plurality of slides 20, 22 and cylinders 30, 32, the second motor 42 can be returned to the first position.

Figure 4:
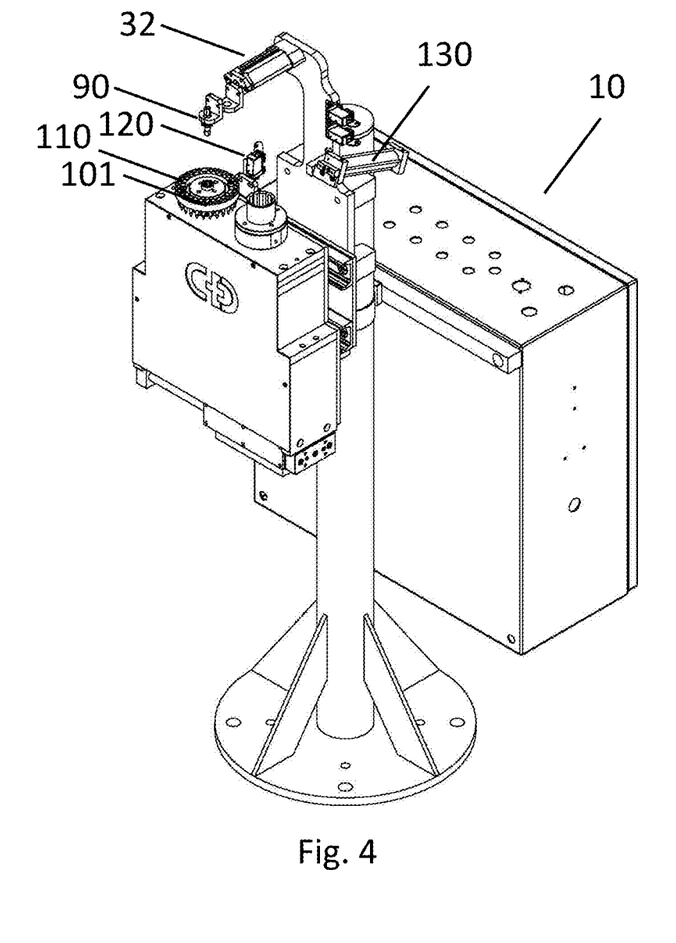
FIG. 4 is a top view of a TIG welder tip changing system according to one embodiment of the present invention.
Figure 5A:
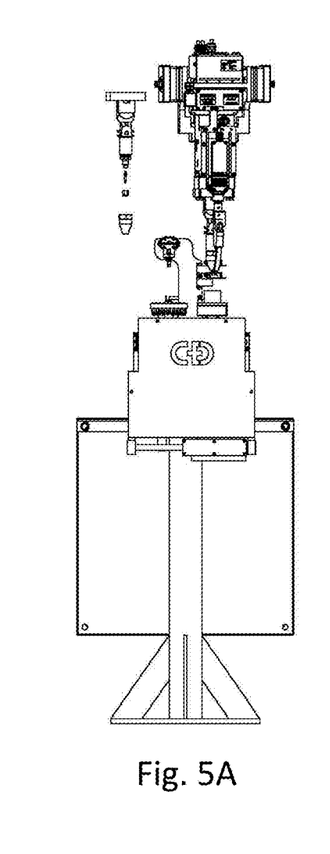
FIG. 5A is a front view of a TIG welder assembly engaged to a TIG welder tip changing system with an exploded view of the TIG welder according to one embodiment of the present invention.
Figure 5B:
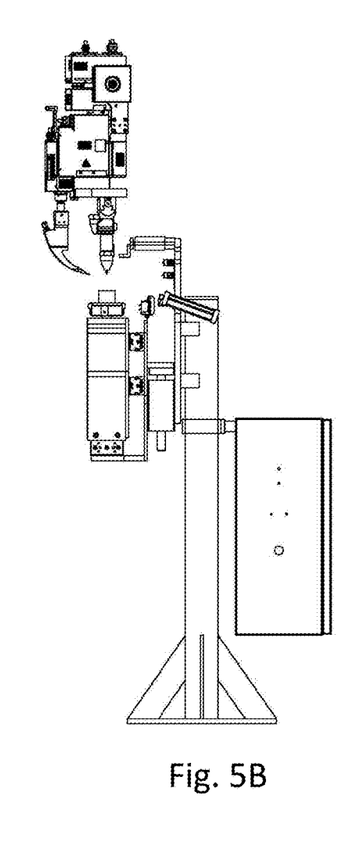
FIG. 5B is a side view of a TIG welder assembly engaged to a TIG welder tip changing system according to one embodiment of the present invention.
Figure 5C:
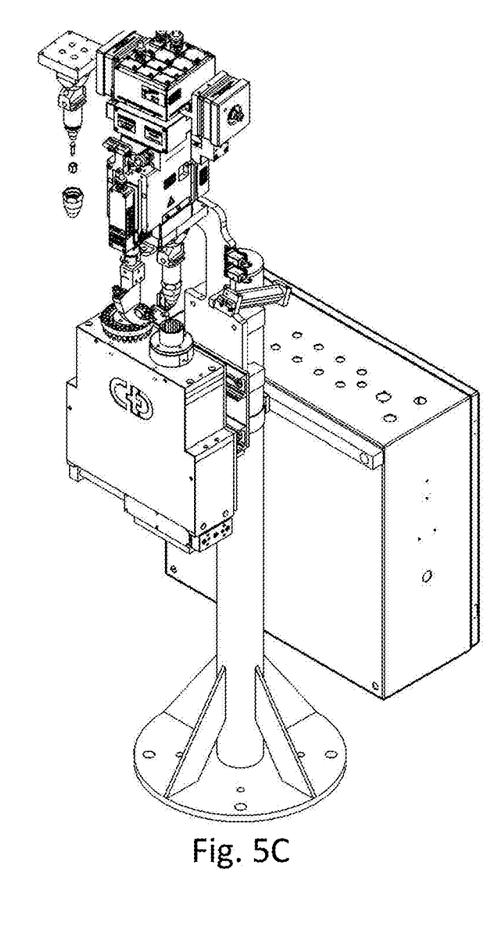
FIG. 5C is a perspective view of a TIG welder assembly engaged to a TIG welder tip changing system with an exploded view of the TIG welder according to one embodiment of the present invention.

Using the plurality of slides 20, 22 and cylinders 30, 32, the second motor 42 is moved to the first position. The arm 80 that carries the vacuum tip suction device 90 returns to a third position with the used electrode tip 100. The used electrode tip 100 is placed into an empty holding position on an electrode tip magazine 110. A sensor and/or an encoder 120 can be utilized to locate an empty holding position on the electrode tip magazine 110 as shown in FIG. 4. The electrode tip magazine 110 can be moved, e.g., rotated, by being attached to the second motor 42 to assist the sensor and/or the encoder 120 in locating the empty holding position on the electrode tip magazine 110. The electrode tip magazine 110 can be moved, e.g., rotated, by being attached to the second motor 42 to assist the sensor and/or the encoder 120 in locating a new electrode tip 101 on the electrode tip magazine 110. Once the new electrode tip 101 is located, the vacuum tip suction device 90 is used to grab the new electrode tip 101. The plurality of slides 20, 22 and cylinders 30, 32 are utilized to move the vacuum tip suction device 90 with the new electrode tip 101 from the third position to a fourth position and to center the new electrode tip 101 above the electrode nut position. The plurality of slides 20, 22 and cylinders 30, 32 are utilized to move the second motor 42 with the removed electrode nut 70 up to the second position. The vacuum suction tip device 90 releases the new electrode tip 101 and the new electrode tip 101 falls into the electrode nut 70.

In the event that a used electrode tip 100 sticks to the TIG welder 220 after the removal of the electrode nut 70, the present invention provides an extra arm 130 for knocking the used electrode tip 100 loose from the TIG welder 220 as shown in FIG. 4. In one embodiment, the extra arm 130 is operatively supported by the upper housing structure 14 of the system 10.

The plurality of slides 20, 22 and cylinders 30, 32 move the second motor number 42 into the first position and the vacuum tip suction device 90 is moved to the third position. The plurality of slides 20, 22 and cylinders 30, 32 move the second motor 42 into the second position while the second motor 42 starts to rotate in a third direction to thread the electrode nut 70 onto the TIG welder 220. The electrode nut 70 is then threaded onto the TIG welder 220 until a first specified torque is achieved, e.g., 200-210 N·cm.

At the completion of threading the electrode nut 70 to the first specified torque, the plurality of slides 20, 22 and cylinders 30, 32 return the second motor 42 to the first position. The plurality of slides 20, 22 and cylinders 30, 32 move the first motor 40 into the second position while the first motor 40 starts to rotate in a fourth direction to thread the gas shield 50 onto the TIG welder 220. The gas shield 50 in then threaded onto the TIG welder 220 until the second specified torque is achieved, e.g., 50-60 N·cm. At the completion of threading the gas shield 50 to the second specified torque, the plurality of slides 20, 22 and cylinders 30, 32 return the first motor 40 to the first position. The TIG welder 220 is now moved by the robotic arm holding the TIG welder 220 back to a TIG welding position.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

We claim:

1. An apparatus for replacing used electrode tips of a TIG welder, the apparatus comprising:
    a main housing structure;
    a socket adapter assembly for threading and unthreading an electrode tip to and from, respectively, the TIG welder, the socket adapter assembly operatively supported by said main housing structure; and
    a vacuum tip suction device for removing an electrode tip from the TIG welder, the vacuum tip suction device operatively supported by said main housing structure.

2. The apparatus of claim 1 further comprising an electrode tip magazine operatively supported by said main housing structure.

3. The apparatus of claim 2 further comprising a sensor operatively connected to said electrode tip magazine.

4. The apparatus of claim 1 further comprising a moveable arm operatively supported by said main housing structure.

5. The apparatus of claim 1 further comprising a first motor operatively connected to said socket adapter assembly.

6. The apparatus of claim 5 further comprising a second socket adapter assembly and a second motor operatively connected to said second socket adapter assembly.

7. The apparatus of claim 1 further comprising a plurality of slides and cylinders operatively connected to said main housing structure.

8. An apparatus for replacing used electrode tips of a TIG welder, the apparatus comprising:
    a lower housing structure;
    a first moveable slide operatively connected to said lower housing structure;
    a first cylinder operatively supported by said first moveable slide;
    an upper housing structure operatively supported by said first moveable slide;
    a socket adapter assembly for threading and unthreading an electrode tip to and from, respectively, the TIG welder, the socket adapter assembly operatively supported by said upper housing structure; and
    a vacuum tip suction device for removing an electrode tip from the TIG welder, the vacuum tip suction device operatively supported by said upper housing structure.

9. The apparatus of claim 8 further comprising an electrode tip magazine operatively supported by said upper housing structure.

10. The apparatus of claim 9 further comprising a sensor operatively connected to said electrode tip magazine.

11. The apparatus of claim 8 further comprising a second moveable slide operatively connected to said first cylinder.

12. The apparatus of claim 8 further comprising a moveable arm operatively supported by said upper housing structure.

13. The apparatus of claim 8 further comprising a first motor operatively connected to said socket adapter assembly.

14. The apparatus of claim 13 further comprising a second socket adapter assembly and a second motor operatively connected to said second socket adapter assembly.

15. The apparatus of claim 8 further comprising a second cylinder operatively connected to said vacuum tip suction device.

\* \* \* \* \*